(12) United States Patent
Saha et al.

(10) Patent No.: US 7,485,594 B2
(45) Date of Patent: Feb. 3, 2009

(54) POROUS MULLITE BODIES AND METHODS OF FORMING THEM

(75) Inventors: Chandan Saha, West Bloomfield, MI (US); Sharon Allen, Midland, MI (US); Chan Han, Midland, MI (US); Robert T. Nilsson, Midland, MI (US); Arthur R. Prunier, Jr., Midland, MI (US); Aleksander J. Pyzik, Midland, MI (US); Sten A. Wallin, Midland, MI (US); Robin Ziebarth, Midland, MI (US); Timothy J. Gallagher, Midland, MI (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 11/799,413

(22) Filed: May 1, 2007

(65) Prior Publication Data
US 2007/0213207 A1 Sep. 13, 2007

Related U.S. Application Data

(62) Division of application No. 10/551,728, filed on Oct. 3, 2005.

(51) Int. Cl.
C04B 35/00 (2006.01)

(52) U.S. Cl. .................. 501/128; 264/629; 264/630; 264/631; 501/80; 60/297; 502/202; 502/407; 502/411; 502/423; 502/427; 422/178; 422/180; 528/15; 202/502; 202/506; 202/510

(58) Field of Classification Search ............. 501/80, 501/128, 202, 407, 411, 423, 427; 60/297; 502/202, 407, 411, 423, 427; 422/177; 528/15; 210/502.1, 506, 510.1; 264/629–631
See application file for complete search history.

(56) References Cited

U.S. PATENT DOCUMENTS

| 4,293,357 | A | | 10/1981 | Higuchi et al. |
|---|---|---|---|---|
| 4,304,585 | A | | 12/1981 | Oda et al. |
| 4,526,886 | A | * | 7/1985 | Joy, III .................. 502/339 |
| 4,559,193 | A | | 12/1985 | Ogawa et al. |
| 4,608,357 | A | | 8/1986 | Silverman et al. |
| 4,628,042 | A | | 12/1986 | Speronello |
| 4,893,465 | A | | 1/1990 | Farrauto et al. |
| 4,910,172 | A | | 3/1990 | Talmy et al. |
| 4,911,902 | A | | 3/1990 | Talmy et al. |
| 4,948,766 | A | | 8/1990 | Talmy et al. |
| 5,098,455 | A | | 3/1992 | Doty et al. |
| 5,145,806 | A | | 9/1992 | Shirakawa et al. |
| 5,173,349 | A | | 12/1992 | Yavuz et al. |
| 5,194,154 | A | | 3/1993 | Moyer et al. |
| 5,198,007 | A | | 3/1993 | Moyer et al. |
| 5,252,272 | A | | 10/1993 | Yavuz et al. |
| 5,294,576 | A | | 3/1994 | Mizushima et al. |
| 5,340,516 | A | | 8/1994 | Yavuz et al. |
| 5,437,933 | A | | 8/1995 | Coupland et al. |
| 5,504,051 | A | | 4/1996 | Nakamura |
| 5,939,354 | A | * | 8/1999 | Golden ................... 502/400 |
| 6,306,335 | B1 | | 10/2001 | Wallin et al. |
| 6,764,742 | B2 | | 7/2004 | Ichikawa et al. |
| 2001/0038810 | A1 | * | 11/2001 | Wallin et al. ............. 422/177 |
| 2006/0018806 | A1 | * | 1/2006 | Ziebarth et al. .......... 422/177 |

FOREIGN PATENT DOCUMENTS

| DE | 3437641 A1 | 4/1985 |
|---|---|---|
| JP | 59039 782 | 3/1984 |
| JP | 63103877 | 7/1988 |
| JP | 0478447 | 3/1992 |
| JP | 04193782 | 7/1992 |
| JP | 05317727 | 12/1993 |
| WO | WO 03/082773 | 10/2003 |

OTHER PUBLICATIONS

The Institution of Electrical Engineers, Stevenage, GB; 200, Hyunho Shin et al: Mullitization from a multicomponent oxide system in the temperature range 1200 'deg.!-1500 'deg.!C.
Ae-Ean Lee et al. *Ceramics International*, "Effects of precursor pH and sintering temperature on synthesizing and morphology of sol-gel processed mullite".
J. R. Moyer et al., *J. Am. Ceram. Soc.*, 77(4)1083-86 (1994) "A Catalytic Process for Mullite Whiskers", pp. 1083-1085.
J. R. Moyer, *J. Am. Ceram. Soc.*, 78(12)3253-58(1995) "Phase Diagram for Mullite-SiF$_4$", pp. 3253-3258.
J. R. Moyer et al., *J.Am. Ceram. Soc.*, 771 (4), (1994) "Stoichiometry of Fluorotopaz and of Mullite Made from Fluorotopaz" pp. 1087-1089.
Heon-Jin Choi et al., *J. Am. Ceram. Soc.*, 85(2) 481-83 (2002) "Synthesis of Mullite Whiskers", pp. 481-483.

* cited by examiner

*Primary Examiner*—J. A. Lorengo
*Assistant Examiner*—Pegah Parvini

(57) ABSTRACT

A porous mullite composition is made by forming a mixture of one or more precursor compounds having the elements present in mullite (e.g., clay, alumina, silica) and a property enhancing compound. The property enhancing compound is a compound having an element selected from the group consisting of Mg, Ca, Fe, Na, K, Ce, Pr, Nd, Sm, Eu, Gd, Tb, Dy, Ho, Er, Tm, Yb, Lu, B, Y, Sc, La and combination thereof. The mixture is shaped and to form a porous green shape which is heated under an atmosphere having a fluorine containing gas to a temperature sufficient to form a mullite composition comprised substantially of acicular mullite grains that are essentially chemically bound.

15 Claims, No Drawings

POROUS MULLITE BODIES AND METHODS OF FORMING THEM

CROSS-REFERENCE TO RELATED APPLICATION

This application is a divisional (continuation) of copending application Ser. No. 10/551,728 filed Oct. 3, 2005.

FIELD OF INVENTION

The invention relates to mullite bodies and method of forming mullite bodies. In particular, the invention relates to mullite bodies having fused interlocked acicular grains and a method of forming them.

BACKGROUND OF THE INVENTION

Recently, more stringent regulations of particulate matter emitted by diesel engines have been passed in Europe and the United States. To meet these regulations, it is expected that particulate filters will be necessary.

These particulate filters will have to meet multiple contradictory exacting requirements. For example, the filter must have sufficient porosity (generally greater than 55 percent porosity) while still retaining most of the emitted micrometer sized diesel particulates (generally greater than 90 percent capture of the emitted particulates). The filter must also be permeable enough so that excessive back pressure does not occur too quickly, while still being able to be loaded with a great amount of soot before being regenerated. The filter must withstand the corrosive exhaust environment for long periods of time. The filter must have an initial strength to be placed into a container attached to the exhaust system. The filter must be able to withstand thermal cycling (i.e., retain adequate strength) from the burning off of the soot entrapped in the filter (regeneration) over thousands of cycles where local temperatures may reach as high as 1600° C. From these stringent criteria, ceramic filters have been the choice of material to develop a diesel particulate filter.

Early on, ceramic filters of sintered cordierite were explored as a possible diesel particulate filter. Cordierite was explored because of its low cost and use as a three-way catalyst support in automotive exhaust systems. Unfortunately, cordierite has not displayed the capability of high porosity, high permeability and high soot loading in conjunction with retained strength after thousands of regeneration cycles to satisfy the stringent requirements described above.

More recently, silicon carbide has become of interest as filters because of its high strength and ability to maintain strength after thermal cycling. However, silicon carbide suffers, for example, from having to be sintered at high temperature using expensive fine silicon carbide powder. Because silicon carbide is sintered, the pore structure that develops results in limited soot loading before excessive back pressure develops.

In addition, mullite of interlaced crystals grown together have been described by U.S. Pat. No. 5,098,455, for use as a diesel particulate trap. These mullite filters have not met the demanding criteria of a diesel filter such as thermal shock resistance.

Accordingly, it would be desirable to provide both a formation method and a ceramic material that solves one or more of the problems of the prior art, such as one of those described above.

SUMMARY OF THE INVENTION

A first aspect of the present invention is a method for preparing an acicular mullite composition, the method comprising, a) forming a mixture of one or more precursor compounds having the elements present in mullite and a property enhancing compound, the property enhancing compound containing an element selected from the group consisting of Mg, Ca, Fe, Na, K, Ce, Pr, Nd, Sm, Eu, Gd, Tb, Dy, Ho, Er, Tm, Yb, Lu, B, Y, Sc, La and combination thereof.

b) shaping the mixture into a porous green shape, c) heating the porous green shape of step (b) under an atmosphere having a fluorine containing gas and to a temperature sufficient to form a mullite composition comprised substantially of acicular mullite grains that are essentially chemically bound.

A second aspect of the invention is a porous mullite composition comprised substantially of acicular mullite grains that are essentially chemically bound, wherein the mullite composition has a phase on at least a portion of the mullite grains, wherein the phase is comprised of at least one element selected from the group consisting of Ce, Pr, Nd, Sm, Eu, Gd, Tb, Dy, Ho, Er, Tm, Yb, Lu, B, Y, La and Sc.

Surprisingly, the presence of the elements in the phase described above results in a porous acicular mullite structure that has an improved thermal shock factor compared to a mullite composition made in the absence of these elements. In addition, in some compositions of the present invention, such as those containing cerium, a mullite composition is formed that is stronger, denser and yet more permeable than a mullite composition made in the absence these elements.

The mullite body of the present invention may be used in any application suitable for mullite. Examples include filters, refractories, thermal and electrical insulators, reinforcement for composite bodies of metals or plastics, catalysts and catalyst supports.

DETAILED DESCRIPTION OF THE INVENTION

Mullite Composition

The mullite composition is comprised of acicular mullite grains essentially chemically bound. It is desirable that the mullite grains comprise at least about 90 percent of the mullite composition. Preferably the mullite grains comprise at least about 95 percent, more preferably at least about 98 percent, even more preferably at least about 99 percent by volume of the composition. The mullite composition, in addition to the mullite grains, contains a glassy phase comprised of silica and metal impurities in the form of oxides, which may be present in the glass as crystalline precipitates. The glassy phase, generally, is situated at the grain surface and at intersecting grain surfaces.

Acicular mullite grains are grains that have an aspect ratio of greater than about 2 (e.g., length twice as great as width). Desirably, the acicular mullite grains present in the mullite composition have an average aspect ratio of at least about 5. Preferably, the average aspect ratio is at least about 10, more preferably at least about 15, even more preferably at least about 20 and most preferably at least about 40.

Essentially all of the mullite composition's grains are chemically bound to other mullite grains of the body. This means that at most about 1 percent by volume of the mullite grains fail to be bound chemically to other mullite grains. Preferably, essentially all of the mullite grains are chemically bound. Generally, chemically bound is when the grains are sintered or fused together. The fusing and sintering occurs at the grain interfaces, which is generally comprised of an amorphous oxide (glassy) phase (i.e., disordered phase) of Si and may also contain Al.

This phase, in the mullite composition, is comprised of at least one element selected from the group consisting of Ce, Pr, Nd, Sm, Eu, Gd, Tb, Dy, Ho, Er, Tm, Yb, Lu, B, Y, La and Sc. The element or elements may be present in the glass structure itself or may be present as crystalline precipitates within the glass phase comprised of Si described previously.

In a preferred embodiment, the phase contains an oxide of Mg, Ca, Y or combination thereof with an oxide of Nd, Ce, B, Fe or combination thereof. Particularly preferred combinations of oxides are Nd/Mg, Nd/Ca, B/Mg, B/Ca, Ce/Mg, and Ce/Y.

A most preferred combination is Nd/Mg, which gives excellent strength and thermal shock resistance. It has been found that when using this combination that a high strength porous combination can be made. This is thought to be due to complimentary effects each element has on the composition. In particular, it is preferred that the ratio of Nd/Mg in the composition is about 0.1 to about 10 by weight. More preferably the ratio is at least about 0.2, even more preferably at least about 1 and most preferably at least about 2 to more preferably at most about 7 and most preferably at most about 5.

Another most preferred combination is Fe/Mg. In particular, it is preferred that the ratio of Fe/Mg in the composition is about 0.1 to about 10 by weight. More preferably the ratio is at least about 0.2, even more preferably at least about 0.6 and most preferably at least about 0.8 to preferably at most about 5, more preferably at most about 2 and most preferably at most about 1.5 by weight. It is particularly preferred for the ratio to be 1 by weight.

It has been observed that aforementioned combinations of elements allow the formation of an acicular mullite with a particularly improved thermal shock factor. It has been found that acicular mullite containing these combinations of elements result in an acicular mullite that is substantially devoid of mullite grains that have a broomstick structure. Mullite grains having a broomstick structure are characterized by a larger acicular mullite grain that has multiple smaller grains growing out of an end of the grain causing it look like a broomstick. Substantially devoid of these broomstick grains means that the acicular mullite has at most 10 percent by number of the grains are broomstick grains. This is compared to acicular mullite made in the absence of the property enhancing compound generally having more than 10 percent by number of broomstick grains. Preferably at most about 5 percent by number, more preferably at most about 3 percent, even more preferably at most about 2 percent and most preferably at most 1 percent by number of the grains are broomstick grains. It is also preferred that the acicular mullite have essentially no broomstick grains, but only clean acicular grains (i.e., grains that have no smaller grains growing from the end of the grain).

The microstructure may be determined by suitable techniques such as microscopy on a polished section. For example, the average mullite grain size may be determined from a scanning electron micrograph (SEM) of a polished section of the body, wherein the average grain size may be determined by the intercept method described by Underwood in *Quantitative Stereology*, Addison Wesley, Reading, Mass., (1970). The formation of broomstick grains generally is determined from several scanning electron micrographs at a magnification of 500× and 1000× of a fractured mullite surface. The composition of the phase on at least a portion of the mullite grains may be determined by known chemical analysis techniques such as those known in the art of electron microscopy.

The amount of the element present in the phase of the mullite composition may vary over a wide range depending on the properties, microstructures desired and elements selected. Generally, the total amount of the element or elements in the mullite composition is from about 0.01 percent to about 12 percent by volume of the mullite composition, wherein the volume is the volume of the element as an oxide. The total amount of the element or elements present in the mullite composition, preferably is at least about 0.1 percent, more preferably at least about 0.5 percent, and most preferably at least about 1.0 percent to preferably at most about 10 percent, more preferably at most about 5.0 percent, and most preferably at most about 2.0 percent by volume of the mullite composition, wherein the volume is the volume of the element as an oxide. The amount of the element present in the mullite composition may be determined by any suitable bulk analysis technique such as those known in the art (e.g., X-ray fluorescence).

Generally, the mullite composition has a porosity of at least about 40 percent to at most about 85 percent. Preferably, the mullite composition has a porosity of at least about 45 percent, more preferably at least about 50 percent, even more preferably at least about 55 percent, and most preferably at least about 57 percent to preferably at most about 80 percent, more preferably at most about 75 percent, and most preferably at most about 70 percent.

The mullite composition, when used as diesel particulate trap should have a retained strength that is adequate to survive a diesel particulate filter environment. Retained strength is the bending strength of the composition after being heated in air to 800° C. for two hours. Generally, the retained strength is at least about 15 MPa. Preferably, the retained strength is at least about 17 MPa, more preferably the retained strength is at least about 19 MPa, even more preferably at least about 20 MPa and most preferably at least about 25 MPa. The retained strength is generally determined by 4 point bending of a bar cut from a mullite honeycomb. The strength measurement may be made using a known technique such as described by ASTM C1161.

In addition, the mullite composition desirably has a permeability coefficient that is as high as possible to reduce back pressure buildup, while still retaining sufficient particles. The permeability coefficient is proportional, for example, to the total amount of porosity and size of the pores and inversely proportional to tortuousity of the interconnected porosity. Generally, the permeability coefficient should be at least $1 \times 10^{-13}$ m$^2$ as determined using Darcy's equation. Preferably, the permeability coefficient is at least about $2 \times 10^{-13}$ M$^2$. Surprisingly, when Ce is present in the mullite composition, the strength, density and permeability all increase compared to mullite composition made in the same way, absent the property enhancing compound.

Most surprisingly, the mullite composition containing the aforementioned elements has improved thermal shock factor compared to a mullite composition failing to have said elements and having the same porosity. Generally, the thermal shock factor is at least about 200° C., more preferably at least about 300° C., and most preferably at least about 400° C. The thermal shock factor (TSF) is given by the following equation:

$$TSF = \frac{Strength}{(Modulus)(CTE)}$$

where CTE is the coefficient of thermal expansion given in (1/° C.). Mullite's CTE is $5 \times 10^{-6}$ per ° C.

Even though the theoretical Al/Si mullite stoichiometry is 3 ($3Al_2O_3 \cdot 2SiO_2$), the bulk Al/Si stoichiometry of the mullite composition may be any suitable stoichiometry, such as 4Al/Si to 2Al/Si. The most suitable bulk stoichiometry is dependent on factors such as the precursors and processing used and may be readily determined by one skilled in the art. Bulk stoichiometry means the ratio of Al to Si in the body (i.e., not each individual grain). It is preferred that the bulk stoichiometry of the body is less than 3.1, which correlates to an alumina ($Al_2O_3$) to silica ($SiO_2$) stoichiometry of less than 1.55. The Al/Si bulk stoichiometry preferably is at most 3.05, more preferably at most about 3.0, and most preferably at most about 2.95 to preferably at least about 2.2. The bulk stoichiometry may be measured by any suitable techniques, such as those known in the art, including, for example, X-ray fluorescence.

Forming the Mullite

In making the mullite composition, precursor compounds containing Al, Si and oxygen are mixed with a property enhancing compound to form a mixture capable of forming mullite. Precursor compounds that may be used are described in U.S. Pat. Nos. 5,194,154; 5,198,007; 5,173,349; 4,911,902; 5,252,272; 4,948,766 and 4,910,172, each incorporated herein by reference. The mixture may also contain organic compounds to facilitate the shaping of the mixture (e.g., binders and dispersants, such as those described in *Introduction to the Principles of Ceramic Processing*, J. Reed, Wiley Interscience, 1988).

Generally, the mixture is comprised of clay (i.e., hydrated aluminum silicate) and precursor compounds such as, alumina, silica, aluminum trifluoride, fluorotopaz and zeolites. Preferably, the precursor compounds are selected from the group consisting of clay, silica, alumina and mixtures thereof. Most preferably, the mixture is comprised of clay and alumina.

The property enhancing compound may be any compound that is an oxide or forms an oxide when the mullite composition is heated in air, wherein the compound contains an element selected from the group consisting of Mg, Ca, Fe, Na, K, Ce, Pr, Nd, Sm, Eu, Gd, Tb, Dy, Ho, Er, Tm, Yb, Lu, B, Y, Sc, La and combination thereof. Since, the elements listed fail to include Al and Si, the compound necessarily is not a precursor compound (i.e., not a clay or alumina). The property enhancing compound may be an oxide, an inorganic metal salt (e.g., chloride, fluoride, nitrate, chlorate, carbonate) or an organic metal compound such as an acetate. Preferably the compound is an oxide, nitrate, acetate, carbonate or combination thereof. Most preferably the compound is an oxide. In a particular preferred embodiment, the property enhancing compound is talc (hydrated Mg silicate). The amount Si in the precursor compounds must be adjusted when using talc as the property enhancing compound due to the presence of Si in the talc.

Preferably, the property enhancing compound or compounds is one that contains an element selected from the group consisting of Fe, Mg, Ce, Pr, Nd, Sm, Eu, Gd, Tb, Dy, Ho, Er, Tm, Yb, Lu, B, Y, Sc, La and mixture thereof. More preferably, the element is Nd, B, Y, Ce, Fe, Mg or mixture thereof.

In a preferred embodiment of the invention the property enhancing compound is a first compound that contains Nd, Ce, Fe and B or mixture thereof and a second compound or compounds that contain Mg, Ca, Y, Pr, Sm, Eu, Gd, Tb, Dy, Ho, Er, Tm, Yb, Lu, Sc, La or mixture thereof.

The precursor compounds may be selected in proportions so that the resultant mullite has an Al/Si bulk stoichiometry from about 2 to about 4, as described previously. Preferably, the precursors are selected so that the mullite body has an Al/Si bulk stoichiometry of at most about 2.95 to 2, as previously described. It is understood herein that the Al/Si stoichiometry refers to the aluminum and silicon in the precursor that actually form the mullite composition. That is to say, if the fluorine source, for example, is $AlF_3$, the amount of $SiO_2$ present in the precursors for stoichiometry purposes must be reduced by an amount of $SiF_4$ that is volatalized off by the reaction of the fluorine from the $AlF_3$ with the $SiO_2$ to form $SiF_4$.

The property enhancing compound is added to the mixture in an amount generally from about 0.01 percent to about 12 percent by volume of the mixture or in the alternative in an amount sufficient to provide the amount of the oxide in the mullite previously described. Preferably the amount of the compound is at least about 0.1, more preferably at least about 0.5, and most preferably at least about 1.0 to preferably at most about 10, more preferably at most about 5, and most preferably at most about 2.0 percent by volume of the mixture.

The mixture may be made by any suitable method such as those known in the art. Examples include ball, milling ribbon blending, vertical screw mixing, V-blending and attrition milling. The mixture may be prepared dry (i.e., in the absence of a liquid medium) or wet.

The mixture is then shaped into a porous shape by any suitable method, such as those known in the art. Examples include injection molding, extrusion, isostatic pressing, slip casting, roll compaction and tape casting. Each of these is described in more detail in *Introduction to the Principles of Ceramic Processing*, J. Reed, Chapters 20 and 21, Wiley Interscience, 1988.

The shaped porous shape is then heated under an atmosphere containing fluorine and a temperature sufficient to form the mullite composition. Fluorine may be provided in the gaseous atmosphere from sources such as $SiF_4$, $AlF_3$, HF $Na_2SiF_6$ NaF and $NH_4F$. Preferably, the source of fluorine is from $SiF_4$. Preferably the fluorine is separately provided. "Separately provided" means that the fluorine containing gas is supplied not from the compounds in the mixture (e.g., $AlF_3$), but from an external gas source pumped into the furnace heating the mixture. This gas preferably is a gas containing $SiF_4$.

Generally in the method, the porous body is heated to a first temperature for a time sufficient to convert the precursor compounds in the porous body to fluorotopaz and then raised to a second temperature sufficient to form the mullite composition. The temperature may also be cycled between the first and second temperature to ensure complete mullite formation. The first temperature may be from about 500° C. to about 950° C. Preferably, the first temperature is at least about 550° C., more preferably at least about 650° C. and most preferably at least about 725° C. to preferably at most about 850° C., more preferably at most about 800° C. and most preferably at most about 775° C.

The second temperature may be any temperature suitable depending on variables such as the partial pressure of $SiF_4$. Generally, the second temperature is at least about 960° C. to at most about 1700° C. Preferably, the second temperature is at least about 1050° C., more preferably at least about 1075° C. and most preferably at least about 1100° C. to preferably at most about 1600° C., more preferably at most about 1400° C. and most preferably at most about 1200° C.

Generally, during the heating to the first temperature, the atmosphere is inert (e.g., nitrogen) or a vacuum until at least about 500° C., which is when a separately provided fluorine containing gas is desirably introduced. During heating to the first temperature, organic compounds and water may be removed. These may also be removed in a separate heating step common in the art described in *Introduction to the Principles of Ceramic Processing*, J. Reed, Wiley Interscience, 1988. This separate heating step is commonly referred to as binder burnout.

After cooling and forming the mullite composition, the mullite composition maybe further heat treated to improve the retained strength. This heat treatment may be carried out in air, water vapor, oxygen, an inert gas or mixture thereof for a time sufficient to form the mullite composition. Examples of inert gases include nitrogen and the noble gases (i.e., He, Ar, Ne, Kr, Xe, and Rn). Preferably, the heat treatment atmosphere is an inert gas, air, water vapor or mixture thereof. More preferably, the heat treatment atmosphere is nitrogen, air or air containing water vapor.

The time at the heat treatment temperature is a function of the heat treatment atmosphere, particular mullite composition and temperature selected. For example, a heat treatment in wet air (air saturated with water vapor at about 40° C.) generally requires more than several hours to 48 hours at 1000° C. In contrast, ambient air, dry air or nitrogen (air having a relative humidity from about 20 percent to 80 percent at room temperature) desirably is heated to 1400° C. for at least about 2 hours.

Generally, the time at the heat treatment temperature is at least about 0.5 hour and is dependent on the temperature used (i.e., generally, the higher the temperature, the shorter the time may be). Preferably, the time at the heat treatment temperature is at least about 1 hour, more preferably at least about 2 hours, even more preferably at least about 4 hours and most preferably at least about 8 hours to preferably at most about 4 days, more preferably at most about 3 days, even more preferably at most about 2.5 days and most preferably at most about 2 days.

The mullite composition may be particularly useful as a support for a catalyst, such as precious metal catalyst on alumina particles, typically referred to as a catalyst wash coat, used in automotive catalytic converters. It is preferred that the mullite grains have an aspect ratio of at least about 10. It is also preferred that the wash coat makes a thin coating on at least a portion of the mullite grains. A portion is generally when at least about 10 percent of the area of the grains of one region are covered by the catalyst coating. Preferably, substantially all of the grains of one region are coated. More preferably, substantially all of the grains of the composition are coated. Other catalyst applications the mullite composition may be useful include, for example, a catalytic combustor.

Thin coating means that the catalyst wash coating has a thickness generally less than the average smallest dimension of the grains coated. Generally, the thickness of the coating is at most about half the thickness, preferably at most about one third and most preferably at most about one quarter the thickness of the average smallest dimension of the grains coated.

The composition may also be particularly useful as a particulate (soot) trap and oxidation (i.e., exhaust) catalyst for mobile power applications (e.g., diesel engines) and stationary power applications (e.g., power plants). The mullite composition, when used as a diesel particulate trap, may have at least a portion of the mullite grains coated with a catalyst, as described above. Of course, the composition may be useful as soot trap itself without any catalyst.

EXAMPLES

Example 1

Bars were pressed from a mullite precursor having an Al/Si stoichiometry of about 2.95. The precursor was made by dissolving cerium acetate (Alpha-Aesar, Ward Hill, Mass.) in an amount equaling 11.6 percent by weight of the total amount of precursor in a 5 percent by weight of methylcellulose in water solution (METHOCEL A15LV, The Dow Chemical Co., Midland, Mich.). The amount of cerium acetate corresponded to about 3.6 percent by volume cerium oxide in the mullite composition as shown in Table 2. To this, about 57.2 parts by weight (pbw) Pioneer Kaolin (DBK Company, Dry Branch, Ga.) and about 42.8 pbw of kappa-alumina were added. The composition of Pioneer Kaolin is shown in Table 1. The kappa-alumina was prepared by heating aluminum hydroxide (P3 gibbsite, Alcoa, Pittsburgh, Pa.) to 1000° C. for 1 hour. The mixture was stirred for about 1 hour and then dried at 45° C. The dried mixture was ground and passed through a 100 mesh sieve. The dried ground mixture was then pressed into bars using a uniaxial press at pressure from about 5,000 to about 10,000 psi. The bars heated to 1100° C. in 10 hours, holding at 1100° C. for 1 hour, then cooling in 5 hours remove the organic binder (i.e., METHOCEL) and to dehydrate the clay (i.e., bisque fired).

The bisque-fired bars were then placed in a quartz tube reactor lined with nickel foil contained within a furnace. The bars were heated under vacuum to 720° C. At this point, $SiF_4$ gas was introduced into the reactor at a rate of 0.44 sccm/g of sample until the pressure in the tube was 600 torr (80 KPa). The reactor was then heated at 3° C./min to 995°. When the reactor reached 850° C., the $SiF_4$ pressure was reduced to 300 torr (40 KPa) and maintained at this pressure. When the reactor reached 995° C., the heating rate was reduced to 1° C./min. Heating continued, while maintaining the reactor pressure at 300 torr (80 KPa) until the reactor temperature had reached 1120° C. When the evolution of $SiF_4$ substantially ceased, the reactor was evacuated and cooled to ambient temperature The average strength of the bars, as determined by 4 point bend (ASTM C-1161), was 36 MPa. The average porosity of the bars, as determined by measuring the weight and dimensions of the bars, was about 60 percent. The Elastic modulus was about 23 GPa. The calculated thermal shock factor was 313° C. These data are shown in Tables 2 and 3. In addition, the permeability was measured for this composition and it had a permeability of about $4\times10^{-13}$ $m^2$.

Example 2-12

Examples 2-12 were made in the same way as Example 1 except that an additive different that cerium acetate was used as shown in Table 2 and 3. If the additive did not dissolve in water, it was well dispersed in a small amount of water and then mixed with the methycellulose water solution. The pressing pressure for the bars was varied from about 5000 to about 10,000 psi to achieve the final porosity as shown in Tables 2 and 3.

Comparative Examples 1 and 2

Comparative Examples 1 and 2 were made in the same way as Example 1 except that no additive was used and the pressing pressure was varied to give the porosity shown in Tables 2 and 3. The permeability of Comparative Examples 1 and 2 were measured and the permeability was $2 \times 10^{-13}$ m$^2$ and $3 \times 10^{-13}$ m$^2$ respectively.

From the data in Table 1, 2 and 3, each of the porous mullite compositions that contain an additive substantially increases the strength of the composition compared to a mullite composition without the additive for a given porosity and the thermal shock resistance (factor).

In addition, the mullite compositions having an additive may not only display greater strength, thermal shock resistance, but higher density while also having a greater permeability. (see Example 1 compared to Comparative Examples 1 and 2).

TABLE 1

Clay Chemical Composition

| Component | percent by Weight |
| --- | --- |
| SiO$_2$ | 45.7 |
| Al2O3 | 38.5 |
| Fe2O3 | 0.4 |
| TiO2 | 1.4 |
| K2O | 0.1 |
| Na2O | 0.04 |
| MgO | 0.1 |
| CaO | 0.2 |
| Loss on Ignition | At 950° C. 13.6 percent |

TABLE 2

Sixty Percent Porous Mullite Compositions

| Example | Additive | Additive percent by volume as an oxide | Chemistry of Additive | Porosity | Strength (MPa) | Elastic Modulus (GPa) | Thermal Shock Factor (° C.) |
| --- | --- | --- | --- | --- | --- | --- | --- |
| 1 | Ce | 3.6 | acetate | 60 percent | 36 | 23 | 313 |
| 2 | B | 3.6 | oxide | 60 percent | 36 | 18 | 400 |
| 3 | Ca | 3.6 | oxide | 60 percent | 27 | 18 | 300 |
| 4 | Mg | 3.6 | acetate | 60 percent | 39 | 25 | 312 |
| 5 | Nd | 3.6 | oxide | 60 percent | 51 | 20 | 510 |
| 6 | Y | 3.6 | oxide | 60 percent | 33 | 20 | 330 |
| Comp. Ex. 1 | N/A | N/A | N/A | 60 percent | 21 | 15 | 280 |

TABLE 3

65 Percent Porous Mullite Compositions

| Example | Additive | Additive percent by volume | Chemistry of Additive | Porosity | Strength (MPa) | Elastic Modulus (GPa) | Thermal Shock Factor (° C.) |
| --- | --- | --- | --- | --- | --- | --- | --- |
| 7 | Ce | 3.6 | acetate | 65 percent | 30 | 14 | 428 |
| 8 | B | 3.6 | oxide | 65 percent | 29 | 11 | 527 |
| 9 | Ca | 3.6 | oxide | 65 percent | 23 | 14 | 328 |
| 10 | Mg | 3.6 | acetate | 65 percent | 37 | 18 | 411 |
| 11 | Nd | 3.6 | oxide | 65 percent | 42 | 13 | 646 |
| 12 | Y | 3.6 | oxide | 65 percent | 28 | 15 | 373 |
| Comp. Ex. 2 | N/A | N/A | N/A | 65 percent | 19 | 13 | 292 |

What is claimed is:

1. A porous mullite composition comprised substantially of acicular mullite grains that are essentially chemically bound, wherein the mullite composition has a glassy grain boundary phase comprised of silica and metal impurities in the form of metal oxides situated at the mullite grain surfaces and at intersecting grain surfaces, wherein the glassy grain boundary phase is comprised of at least one first element, in the form of an oxide, selected from the group consisting of Mg, Ca, Y and combination thereof and at least one second element, in the form of an oxide, selected from the group consisting of Nd, Ce, B, Fe and combination thereof.

2. The porous mullite composition of claim 1 wherein the ratio of the first element to the second element is from about 0.1 to about 10 by weight.

3. The porous mullite composition of claim 1 wherein the composition has Nd and Mg therein and the ratio of Nd/Mg is from about 0.1 to about 10 by weight.

4. The porous mullite composition of claim 3 wherein the ratio is about 0.2 to about 5.

5. The porous mullite composition of claim 1 wherein the porous mullite composition has a porosity of about 50% to about 70%.

6. The porous mullite composition of claim 1 wherein the porous mullite composition has a thermal shock factor of at least about 300° C.

7. The porous mullite composition of claim 6 wherein the mullite composition has a thermal shock factor of at least about 400° C.

8. A diesel particulate filter comprised of the mullite composition of claim 1.

9. The diesel particulate filter of claim 8 wherein the mullite composition has a catalyst coating on at least a portion of the mullite grains of the mullite composition.

10. A diesel particulate filter comprised of the mullite composition of claim 7.

11. The diesel particulate filter of claim 10 wherein the mullite composition has a catalyst coating on at least a portion of the mullite grains of the mullite composition.

12. A catalyst comprised of the mullite composition of claim 1 having a catalyst coating on at least a portion of the grains of the mullite composition.

13. The catalyst of claim 12 wherein the catalyst is an automotive catalyst for the treatment of exhaust or a catalytic combustor.

14. The mullite composition of claim 1, wherein the first and second element are in the form of crystalline precipitates in the glassy grain boundary phase.

15. The mullite composition of claim 1, wherein the first and second element are a part of the glass structure of the glassy grain boundary phase.

* * * * *